(12) United States Patent
Blatz

(10) Patent No.: US 9,044,836 B2
(45) Date of Patent: Jun. 2, 2015

(54) HAND-HELD POWER TOOL GUIDING DEVICE

(75) Inventor: Thomas Blatz, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 879 days.

(21) Appl. No.: 13/161,802

(22) Filed: Jun. 16, 2011

(65) Prior Publication Data

US 2011/0311329 A1    Dec. 22, 2011

(30) Foreign Application Priority Data

Jun. 17, 2010    (DE) .......................... 10 2010 030 227

(51) Int. Cl.
| | |
|---|---|
| B23B 45/14 | (2006.01) |
| B23Q 9/00 | (2006.01) |
| B25H 1/00 | (2006.01) |
| B23B 39/00 | (2006.01) |
| B25F 5/02 | (2006.01) |

(52) U.S. Cl.
CPC ................ B23Q 9/00 (2013.01); B25H 1/0042 (2013.01); B23B 39/003 (2013.01); *Y10S 408/712* (2013.01); *Y10T 408/91* (2015.01); *Y10T 408/6786* (2015.01); B25F 5/021 (2013.01)

(58) Field of Classification Search
CPC ..... B23B 39/003; B25F 5/021; B25H 1/0042; B23Q 9/00
USPC ...................... 408/136, 234, 712, 99; 16/430; 173/170; 30/296.1
IPC ....................................................... B23B 45/14
See application file for complete search history.

(56) References Cited

U.S. PATENT DOCUMENTS

| | | | | |
|---|---|---|---|---|
| 595,896 | A | * | 12/1897 | Van Dusen et al. ........... 408/136 |
| 770,156 | A | * | 9/1904 | Blood ........................... 408/128 |
| 1,339,958 | A | * | 5/1920 | Karlsson ....................... 408/101 |
| 1,927,006 | A | * | 9/1933 | Guibert et al. ................ 408/136 |
| 2,405,110 | A | * | 8/1946 | Bullock ........................ 173/141 |
| 2,879,678 | A | * | 3/1959 | Kaiser, Jr. ...................... 408/76 |
| 2,950,638 | A | * | 8/1960 | Wier ............................... 408/84 |
| 3,068,722 | A | * | 12/1962 | Carion .......................... 408/136 |
| 3,447,454 | A | * | 6/1969 | Ratz .............................. 100/266 |
| 3,552,239 | A | * | 1/1971 | Yeaman et al. ............... 408/146 |
| 3,837,757 | A | * | 9/1974 | Levine ........................... 408/14 |
| 3,985,188 | A | * | 10/1976 | Steele ........................... 173/170 |

(Continued)

FOREIGN PATENT DOCUMENTS

| | | |
|---|---|---|
| CN | 201552557 U | 8/2010 |
| CN | 101987445 A | 3/2011 |

(Continued)

OTHER PUBLICATIONS

U.S. Patent Application, "Hand-Held Power Tool Guiding Device and Method", filed Jun. 16, 2011, Inventor Thomas Blatz.

(Continued)

*Primary Examiner* — Eric A Gates
(74) *Attorney, Agent, or Firm* — Crowell & Moring LLP

(57) ABSTRACT

A hand-held power tool guiding device is disclosed. The device includes a receptacle element for receiving the power tool, a remote control device for operating the power tool, and a guiding and support device, which is designed to be adjustable with an adjusting lever. The adjusting lever has a handle which is configured to be rotatable relative to the adjusting lever around an axis of rotation.

7 Claims, 4 Drawing Sheets

(56) References Cited

U.S. PATENT DOCUMENTS

| | | | | |
|---|---|---|---|---|
| 4,284,373 | A | * | 8/1981 | Wolff ............................ 408/87 |
| 4,442,905 | A | * | 4/1984 | Agoston ........................ 173/36 |
| 4,585,376 | A | * | 4/1986 | Davenport et al. ........... 408/110 |
| 4,648,758 | A | * | 3/1987 | Itzov ............................. 408/136 |
| 4,655,649 | A | * | 4/1987 | Itzov et al. ................... 408/136 |
| 4,684,303 | A | * | 8/1987 | Erdt et al. ..................... 409/235 |
| 4,740,119 | A | * | 4/1988 | Lierz ............................. 408/111 |
| 5,035,549 | A | * | 7/1991 | Asano et al. .................. 408/132 |
| 5,046,900 | A | * | 9/1991 | Heiter et al. .................. 408/84 |
| 5,137,235 | A | * | 8/1992 | Wentworth et al. ......... 248/124.1 |
| 5,231,727 | A | * | 8/1993 | Armbruster .................... 15/97.1 |
| 5,322,397 | A | * | 6/1994 | Spear ............................. 408/99 |
| 5,595,259 | A | * | 1/1997 | Gilliland et al. .............. 180/332 |
| 5,598,892 | A | * | 2/1997 | Fox ............................... 173/170 |
| 5,676,503 | A | * | 10/1997 | Lang ............................. 408/234 |
| 5,797,708 | A | * | 8/1998 | Bencic .......................... 408/112 |
| 5,820,317 | A | * | 10/1998 | Van Troba .................... 408/136 |
| 5,888,031 | A | * | 3/1999 | Buck et al. .................... 408/56 |
| 6,095,724 | A | * | 8/2000 | Hurt .............................. 408/136 |
| 6,264,407 | B1 | * | 7/2001 | Tinken .......................... 408/136 |
| 7,070,366 | B2 | * | 7/2006 | Reichenberger et al. ....... 408/76 |
| 7,226,252 | B2 | * | 6/2007 | Glodowski .................... 408/1 R |
| 7,360,973 | B2 | * | 4/2008 | Turner ........................... 408/92 |
| 7,520,702 | B2 | * | 4/2009 | Wiehler et al. ................ 408/136 |
| 7,802,665 | B2 | * | 9/2010 | Tong .............................. 190/115 |
| 2005/0152756 | A1 | * | 7/2005 | Howard ........................ 408/103 |
| 2005/0214085 | A1 | * | 9/2005 | Owens .......................... 408/136 |
| 2007/0217879 | A1 | * | 9/2007 | Larsson ......................... 408/129 |
| 2008/0202264 | A1 | * | 8/2008 | Howland ....................... 74/156 |
| 2009/0084648 | A1 | | 4/2009 | Tong |
| 2011/0027029 | A1 | * | 2/2011 | Lanser ........................... 408/115 R |

FOREIGN PATENT DOCUMENTS

| | | | | |
|---|---|---|---|---|
| DE | 299 08 682 U1 | | 9/1999 | |
| JP | 60141414 A | * | 7/1985 | .............. B23B 45/14 |

OTHER PUBLICATIONS

Chinese Office Action dated Sep. 9, 2014, with English translation (Fifteen (15) pages).

* cited by examiner

HAND-HELD POWER TOOL GUIDING DEVICE

This application claims the priority of German Patent Document No. 10 2010 030 227.9, filed Jun. 17, 2010, the disclosure of which is expressly incorporated by reference herein.

BACKGROUND AND SUMMARY OF THE INVENTION

The present invention relates to a hand-held power tool guiding device.

Drilling overhead in ceilings using hand-operated drilling equipment presents difficulties for the operator. Drilling equipment, above all core drills, is very heavy so the operator is only able to manually apply the required feed force for a brief time. Furthermore, because of the ceiling height the operator must work on ladders or other auxiliary equipment in order to create boreholes in the ceiling.

Guiding devices in the form of ceiling drill stands, in which drilling equipment is inserted, are known for creating boreholes in ceilings. Additional examples of known guiding devices are drill stands for creating boreholes in walls or in the floor, and moveable guide wagons equipped with rollers for creating kerfs in the floor. The various drilling tools, sawing tools and other power tools are summarized under the designation "power tool."

Known guiding devices include a receptacle element (in which the power tool is inserted and fastened), an adjustable guiding and support device, and a remote control device for operating the power tool. The movement of the remote control device is transmitted to the power tool by a transmission device. The feed motion of the power tool is effected via an adjusting device, which has a lifting device and an adjusting lever. A handle, which is used to actuate the adjusting lever, is attached to the adjusting lever. The adjusting lever is designed to be adjustable between a first and second end position.

The disadvantage of known guiding devices is that the hand lever of the remote control device is attached to the handle and the handle is rigidly connected to the adjusting lever. If the adjusting lever is adjusted between the first and second end positions, the position of the hand lever relative to the operator changes and the grip position can be ergonomically unfavorable for the operator.

It would be desirable to improve a device for guiding a power tool with regard to the disadvantages explained above. The object of the present invention is making available a device for guiding a power tool in which the operator is able to operate the remote control device ergonomically in every position of the adjusting lever.

According to the invention, the handle is designed to be rotatable relative to the adjusting lever around an axis of rotation. Because the handle is designed to be rotatable relative to the adjusting lever, the handle can be rotated by the operator into an ergonomically favorable position when actuating the adjusting lever. The remote control device, which is attached to the handle, can be operated easily in every position of the adjusting lever.

In a preferred embodiment, the handle has a sleeve and an axis element, wherein the sleeve is rotatable relative to the axis element around the axis of rotation. The handle preferably has a reset device for resetting the sleeve to a neutral position. The handle is rotated back into a neutral position by the reset device so that the operator will find the handle in an ergonomic position. Moreover, the reset device prevents a Bowden cable, which transmits the movement of the remote control device to a device switch of the power tool, from getting wound on the hand lever or on the handle.

The reset device is preferably arranged between the axis element and the sleeve, and in the process is preferably configured as a leg spring having a first and a second leg, wherein the first leg engages in a first slot in the axis element and the second leg engages in a second slot in the sleeve. Configuring the reset device as a leg spring between the axis element and the sleeve makes a compact design of the handle possible.

In a preferred embodiment, the axis element is lockable by a locking device on the adjusting lever and is rotatable around the axis of rotation when the locking device is opened. The rotatability of the axis element around the axis of rotation makes it possible for the operator to adapt the neutral position of the handle to his/her personal preferences. For this purpose, the locking device is disengaged; the axis element is rotated into any position by a rotation around the axis of rotation, and then locked again by the locking device.

In a preferred embodiment, a securing device is provided, which locks the adjusting lever in a transport position. The securing device preferably has a hook element, which is attached to the receptacle element and cooperates in the transport position with the adjusting lever.

In the transport position, the hook element is in engagement with a hand lever of the remote control device. The advantage of this embodiment is that, in addition to locking the adjusting lever in the transport position, the hand lever of the remote control device is locked by the hook element and therefore is blocked so that an additional locking device for the hand lever can be dispensed.

Exemplary embodiments of the invention are described in the following on the basis of the drawings. These drawings are not necessarily supposed to represent the exemplary embodiments to scale; rather, the drawings are executed in a schematic or slightly distorted form when it is useful for explanatory purposes. Reference is made to the pertinent prior art with respect to additions to the teachings directly identifiable from the drawings. It must be taken into consideration in this case that a wide range of modifications and changes related to the form and detail of an embodiment can be undertaken without deviating from the general idea of the invention. The features of the invention disclosed in the description, the drawings, as well as in the claims, may be essential for the further development of the invention both separately as well as in any combination. Moreover, all combinations of at least two features disclosed in the description, the drawings and/or the claims fall within the scope of the invention. The general idea of the invention is not restricted to the exact form or detail of the preferred embodiment described and depicted in the following or restricted to a subject matter, which would be limited as compared to the subject matter claimed in the claims. In the case of any dimensioning ranges given, values within the stated limits are also meant to be disclosed as limit values, and be applicable at will and claimable. For the sake of simplicity, the same reference numbers are used in the following for identical or similar parts having an identical or similar function.

Additional advantages, features and details of the invention are disclosed in the following description of the preferred exemplary embodiment as well as on the basis of the drawings.

DETAILED DESCRIPTION OF THE DRAWINGS

Figure 1:
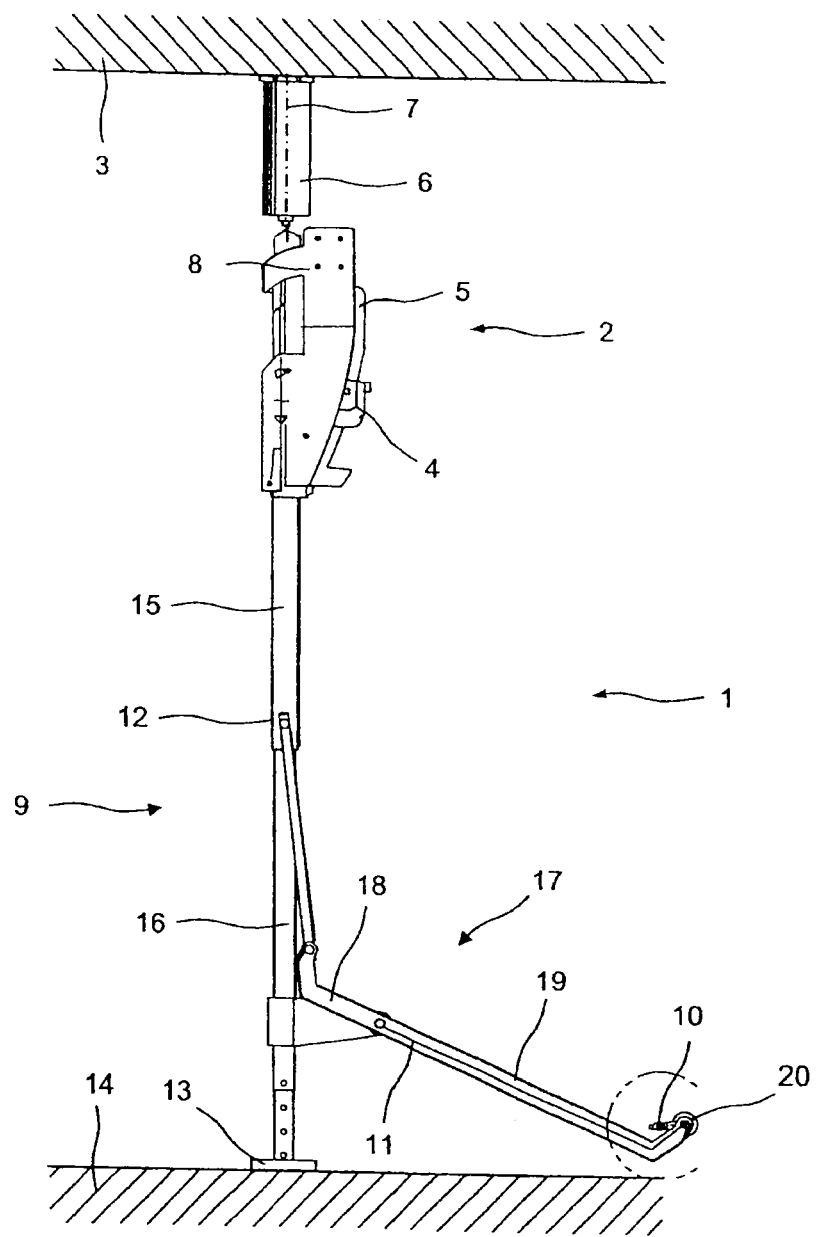
FIG. 1 illustrates a drill stand according to the invention with a drilling apparatus for creating boreholes in a ceiling.

FIG. 1 depicts a guiding device 1 according to the invention, configured as a drill stand and having a power tool 2, which is configured as a drilling apparatus and is inserted into the drill stand 1. The drill stand 1 is configured as a ceiling drill stand for creating boreholes in a ceiling 3. Other examples of guiding devices according to the invention are drill stands for creating boreholes in walls or in the floor, and moveable guide wagons for creating kerfs in walls, floors and/or the ceiling.

The drilling apparatus 2 is made of a handle 4 for holding and guiding the drilling apparatus 2 and a motor and gear unit 5, which drives a tool 6 around an axis of rotation 7. A device switch is integrated into the handle 4 for the operator to turn the drilling apparatus 2 on and off.

The drill stand 1 is comprised of a receptacle element 8 for receiving the drilling apparatus 2, an adjustable guiding and support device 9 and a remote control device 10 for the operator to operate the drilling apparatus 2 at a remote location away from the handle 4 of the drilling apparatus 2. The movement of the remote control device 10 is transmitted to the drilling apparatus 2 via a transmission device 11.

The guiding and support device 9 is made of a guide rod 12, which rests on a base 14 via a support foot 13. The guide rod 12 is designed to be two-piece with a first section 15 and a second section 16, which are free to slide relative to one other in a telescoping manner. The first section 15 is connected to the receptacle element 8, and the second section 16 is connected to the support foot 13. Moving the drilling apparatus 2 against the ceiling 3 is accomplished via a feed device 17, which has a lifting device 18 and an adjusting lever 19. The lifting device 18 may be configured as a pressurized cylinder, as a gear rod, as a spindle or as a comparable lifting device. A handle 20, which is used to actuate the adjusting lever 19, is attached to the adjusting lever 19. The adjusting lever 19 is designed to be adjustable between a first and a second end position.

Figure 2:
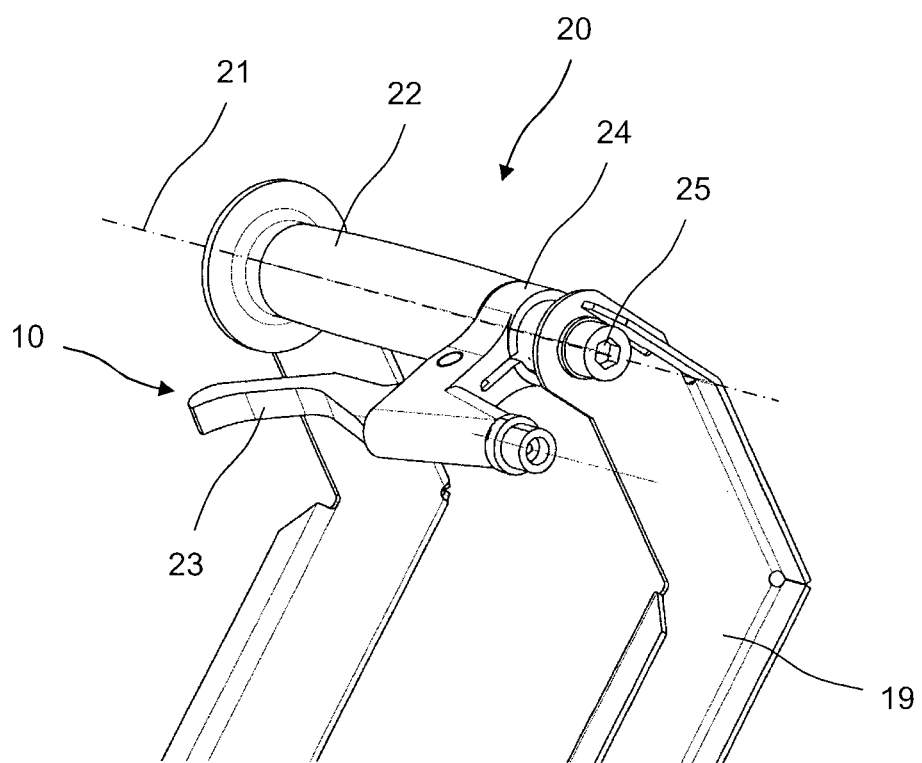
FIG. 2 is a detailed view of the handle of the drill stand from FIG. 1.

FIG. 2 depicts the handle 20 attached to the adjusting lever 19 in detail. By actuating the adjusting lever 19, the drilling apparatus 2 is moved against the ceiling 3 and a feed force is exerted against the ceiling 3. The guiding and support device 9 is designed such that the operator is able to exert a high feed force of the drilling apparatus 2 against the ceiling 3 with little force.

The handle 20 is configured to be rotatable around an axis of rotation 21 and includes a grip element 22 with an ergonomic shape. The remote control device 10 is configured as a mechanical remote control device and includes a hand lever 23, which is fastened on the grip element 22 with a fastening element 24. The hand lever 23 is arranged in such a way that the operator may leave his hands on the handle 20 when he actuates the hand lever 23. The handle 20 is lockable by a locking device 25 on the adjusting lever 19. The locking device 25 is configured as a screw in FIG. 2. It is understood that various design forms may be considered for the locking device 25.

Figure 3A:
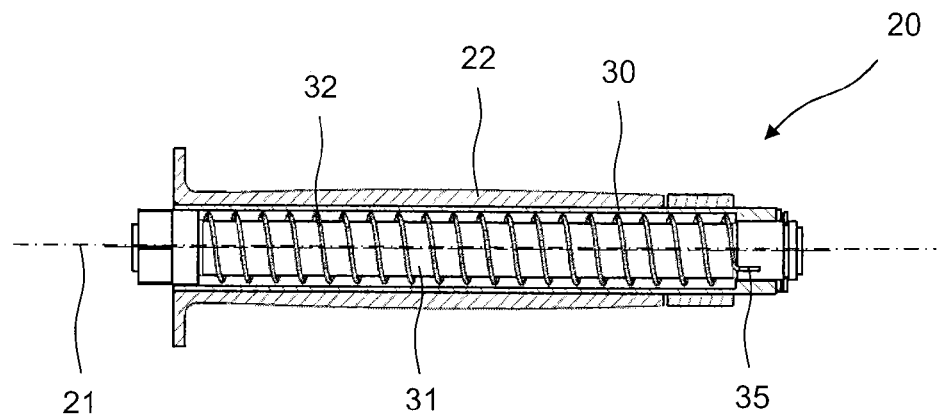
FIGS. 3a and 3b illustrate the handle from FIG. 2 in a cross-section (FIG. 3a) and an exploded view (FIG. 3b)
Figure 3B:
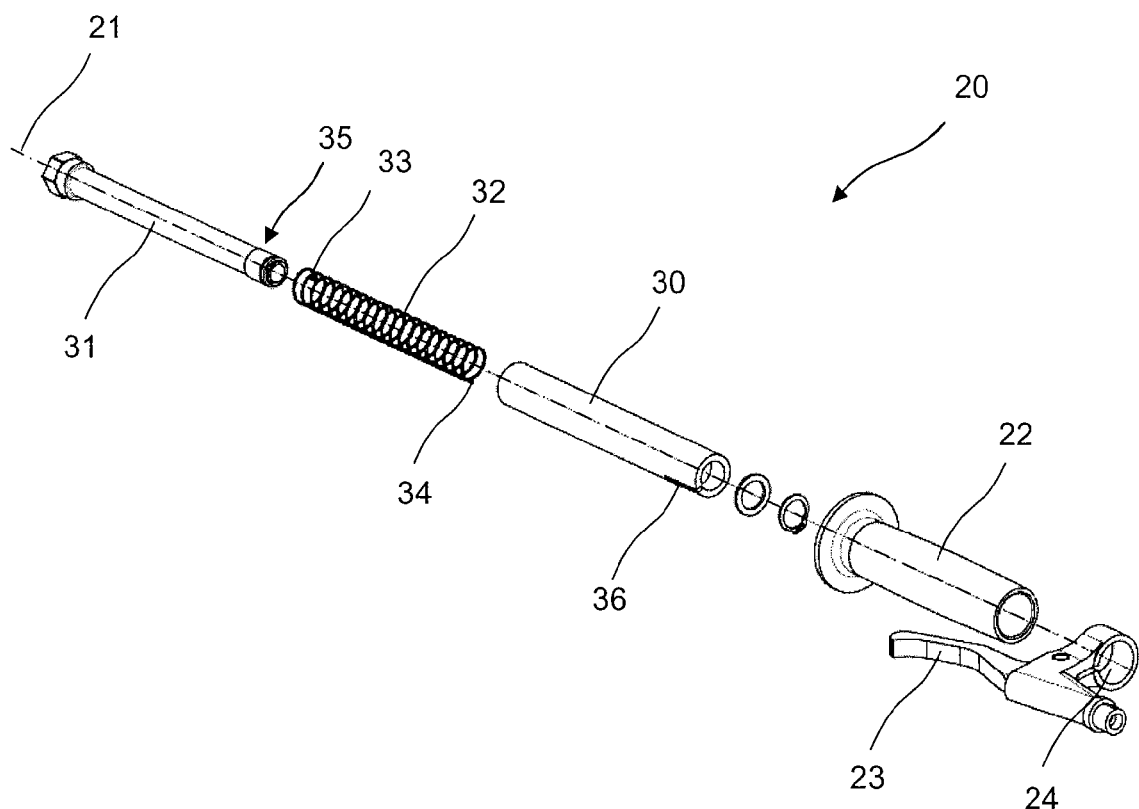

FIGS. 3a and 3b show the handle 20 in a cross-section (FIG. 3a) and an exploded view (FIG. 3b).

Along with the grip element 22, the handle 20 includes a sleeve 30, which is arranged on an axis element 31 so it can rotate around the axis of rotation 21. A resetting element 32 in the form of a leg spring is provided between the axis element 31 and the sleeve 30. The first and second legs 33, 34 of the leg spring 32 engage in a first slot 35 in the axis element 31 and in a second slot 36 in the sleeve 30, respectively.

The resetting element 32 makes sure that the handle 20 returns to a neutral position after the operator lets go of it. The position of the handle 20 where no force acts on the resetting element 32 is defined as the neutral position. If the handle 20 is rotated in a rotational direction by the operator when actuating the adjusting lever 19, the resetting element 32 is tensioned. As soon as the operator lets go of the handle 20, the restoring force of the resetting element 32 acts on the sleeve 30 and rotates the sleeve 30 opposite the rotational direction around the axis element 31 back into the neutral position.

The axis element 31 is lockable by the screw 25 on adjusting lever 19. After the screw 25 is loosened, the axis element 31 is rotatable around the axis of rotation 21 and lockable again in any position by the screw 25. The position in which the axis element 31 is locked relative to the adjusting lever 19 determines the neutral position of the handle 20.

Because of the rotatability of the axis element 31 relative to the adjusting lever 19, the operator is able to put the handle 20 in a neutral position that is optimum for him/her. As a result, the remote control device 10 is easy to operate ergonomically in all positions of the adjusting lever 19.

Figure 4A:
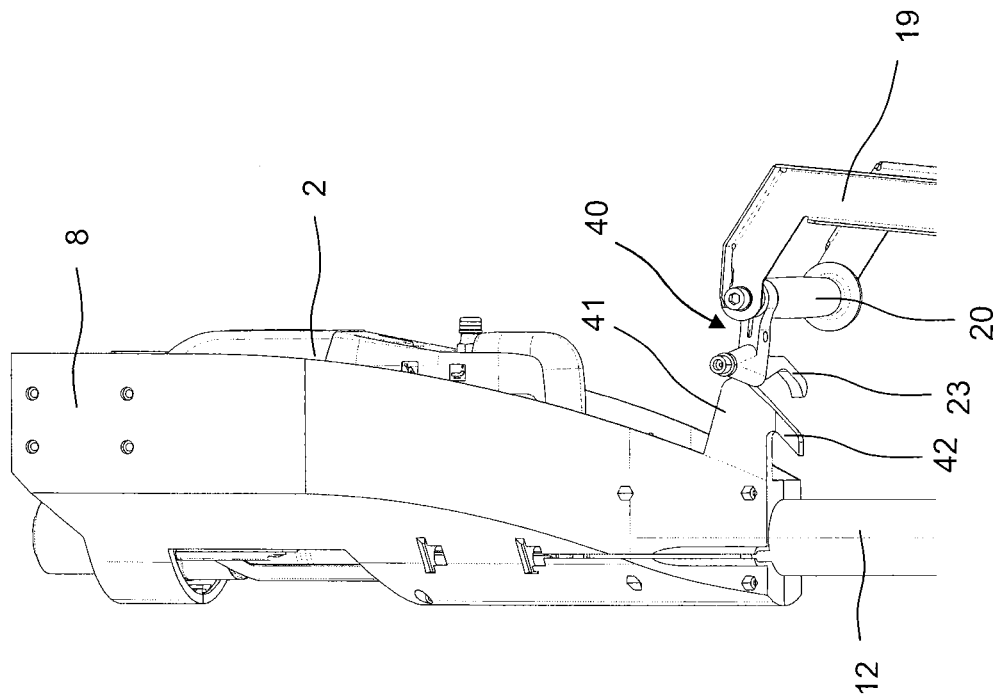
FIGS. 4a and 4b illustrate the adjusting lever of the drill stand in an operating position (FIG. 4a) and a transport position (FIG. 4b).
Figure 4B:
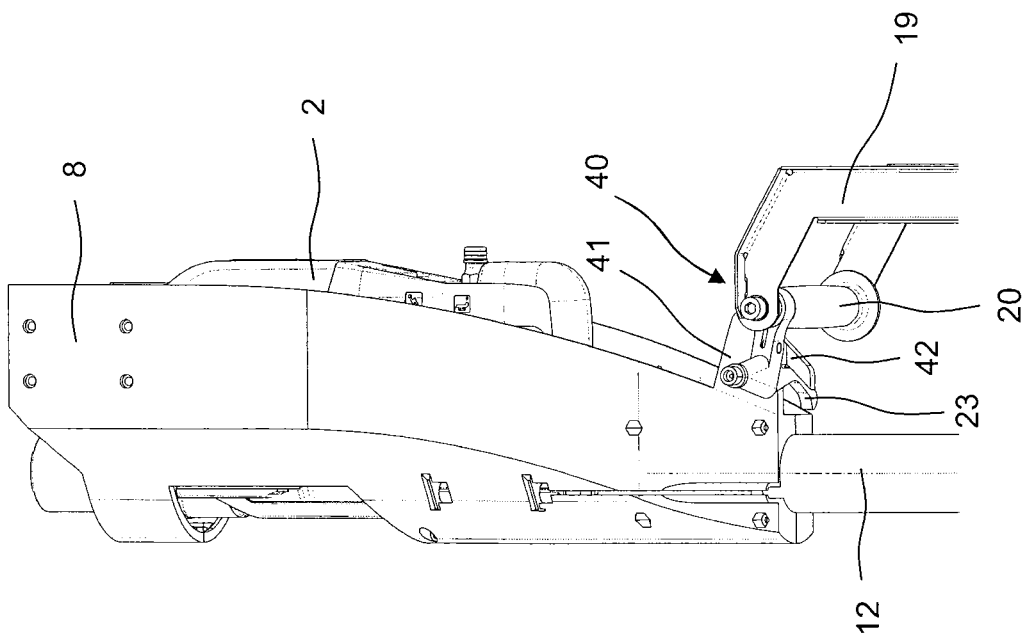

In addition to the ergonomic operation of the drill stand 1, the rotatable handle 20 is used to secure the adjusting lever 19 for transport. FIGS. 4a and 4b show the adjusting lever 19 of the drill stand 1 in an operating position (FIG. 4a) and a transport position (FIG. 4b).

In order to transport and store the drill stand 1, the drill stand 1 features a securing device 40 for securing the adjusting lever 19 in the transport position. The securing device 40 features a hook element 41, which is arranged on the receptacle element 8 and cooperates with the hand lever 23 of the remote control device 10.

To secure the adjusting lever 19, the operator moves the adjusting lever 19 into the upper end position, where the hand lever 23 makes contact with the hook element 41 as shown in FIG. 4a. The hook element 41 features a barbed hook 42, which in the depicted embodiment is directed toward the substrate 14. The handle 20 is rotated by the operator around the axis of rotation 21, and the hand lever 23 dips under the barbed hook 42. When the operator lets go of the handle 20, the resetting element 32 exerts a restoring force on the handle 20, which wants to move the handle 20 back into its neutral position. However, it is reset only so far until the hand lever 23 makes contact with hook element 41.

Alternatively, the hook element 41 may have a beveled side surface along which the hand lever 23 slides. The operator moves the adjusting lever 19 until it makes contact with the hook element 41 and exercises a further force on the adjusting lever 19. The hand lever 23 slides along on the side surface of the hook element 41 and produces a rotation of the handle 20 around the axis of rotation 21. The hand lever 23 dips under the barbed hook and the resetting element 32 exerts a restoring force on the handle 20 until the hand lever 23 makes contact with hook element 41 and is blocked.

The additional advantage of the embodiment depicted in FIG. 4b, in which the hand lever 23 is in engagement with the hook element 41, is that the hand lever 23 is blocked and inadvertent actuation of the hand lever 23 in the transport position is prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A guiding device for a power tool, comprising:
a receptacle element;
a remote control device;
a guiding and support device coupled between the receptacle element and the remote control device, wherein the guiding and support device includes an adjusting lever with a handle and wherein the handle is rotatable relative to the adjusting lever around an axis of rotation; and
a securing device disposed on the receptacle element, wherein the adjusting lever is lockable in a transport position by the securing device;
wherein the securing device includes a hook element, and wherein the hook element is attached to the receptacle element and cooperates with the adjusting lever in the transport position and wherein the hook element includes a barbed hook;
and wherein in the transport position, the barbed hook of the hook element engages with a hand lever of the remote control device.

2. A guiding device for a power tool, comprising:
a receptacle element;
a remote control device;
a guiding and support device coupled between the receptacle element and the remote control device, wherein the guiding and support device includes an adjusting lever with a handle and wherein the handle is rotatable relative to the adjusting lever around an axis of rotation; and
a securing device disposed on the receptacle element, wherein the adjusting lever is lockable in a transport position by the securing device;
wherein the securing device includes a hook element and wherein the hook element is attached to the receptacle element and cooperates with the adjusting lever in the transport position;
wherein in the transport position, the hook element is in engagement with a hand lever of the remote control device;
and wherein the handle has a sleeve and an axis element, wherein the sleeve is rotatable relative to the axis element around the axis of rotation.

3. The device according to claim 2, wherein the handle has a reset device and wherein the sleeve is resettable to a neutral position by the reset device.

4. The device according to claim 3, wherein the reset device is arranged between the axis element and the sleeve.

5. The device according to claim 4, wherein the reset device is a leg spring having a first leg and a second leg and wherein the first leg engages in a first slot in the axis element and the second leg engages in a second slot in the sleeve.

6. The device according to claim 2, further comprising a locking device disposed on the adjusting lever, wherein the axis element is lockable by the locking device.

7. The device according to claim 6, wherein the axis element is rotatable around the axis of rotation when the locking device is opened.

* * * * *